(12) United States Patent
Hessdörfer

(10) Patent No.: US 9,630,535 B2
(45) Date of Patent: Apr. 25, 2017

(54) ARM REST FOR USE IN THE CONTEXT OF A VEHICLE SEAT

(71) Applicant: F.S. Fehrer Automotive GmbH, Kitzingen (DE)

(72) Inventor: Thomas Hessdörfer, Karlstadt (DE)

(73) Assignee: F. S. FEHRER AUTOMOTIVE GMBH, Kitzingen (DE)

(*) Notice: Subject to any disclaimer, the term of this patent is extended or adjusted under 35 U.S.C. 154(b) by 68 days.

(21) Appl. No.: 14/829,497

(22) Filed: Aug. 18, 2015

(65) Prior Publication Data

US 2016/0052429 A1    Feb. 25, 2016

(30) Foreign Application Priority Data

Aug. 20, 2014 (DE) .................. 10 2014 111 925

(51) Int. Cl.
*A47C 1/03* (2006.01)
*B60N 2/46* (2006.01)

(52) U.S. Cl.
CPC .............. *B60N 2/4606* (2013.01); *A47C 1/03* (2013.01); *B60N 2/4633* (2013.01)

(58) Field of Classification Search
CPC .. B60N 2/4606; B60N 2/4633; B60N 2/4613; A47C 1/03
USPC .......................................... 297/411.1–411.46
See application file for complete search history.

(56) References Cited

U.S. PATENT DOCUMENTS

| | | | |
|---|---|---|---|
| 3,468,582 A * | 9/1969 | Judd .................. | B64D 11/06 294/122 |
| 3,612,606 A * | 10/1971 | Swenson ............... | A47C 7/543 297/396 |
| 5,597,209 A * | 1/1997 | Bart ..................... | B60N 2/4633 297/411.32 |
| 7,100,242 B2 * | 9/2006 | Maierholzner ...... | B60N 2/4435 16/319 |
| 8,132,861 B2 * | 3/2012 | Cone .................... | B60N 2/4633 297/411.32 |
| 8,516,668 B2 * | 8/2013 | Weber .................. | B60N 2/4633 29/11 |
| 8,931,847 B2 * | 1/2015 | Cailleteau ........... | B60N 2/0224 297/411.3 |
| 2003/0020315 A1 * | 1/2003 | Laval ................... | B60N 2/4686 297/411.32 |
| 2007/0085404 A1 * | 4/2007 | Chen ...................... | A47C 1/03 297/411.38 |
| 2007/0158991 A1 * | 7/2007 | Chen .................... | B60N 2/4633 297/411.32 |

(Continued)

FOREIGN PATENT DOCUMENTS

DE        10257123 A1      6/2004
DE    102012211447 A1      1/2014

*Primary Examiner* — Syed A Islam
(74) *Attorney, Agent, or Firm* — Quarles & Brady LLP

(57) ABSTRACT

An arm rest for a vehicle seat includes an injection molded plastic console part and an arm support mounted at the console part so as to be swivelable about a swivel axis between a use position and a rest position. The console part includes a mounting sleeve on opposing sides of the console part. One mounting stud of the arm support is mounted in each sleeve. A metal bearing ring injected in each mounting sleeve encloses the mounting stud annularly, wherein a radially outwardly extending bearing surface is arranged at each of the mounting sleeves is borne by a tab integrally molded to the bearing ring.

9 Claims, 2 Drawing Sheets

(56) References Cited

U.S. PATENT DOCUMENTS

| | | | | |
|---|---|---|---|---|
| 2012/0104822 A1* | 5/2012 | Henke | ............ | B60N 2/4613 |
| | | | | 297/411.32 |
| 2012/0267933 A1* | 10/2012 | von Rothkirch und Panthen | ............ | B60N 2/4686 |
| | | | | 297/411.32 |
| 2015/0223610 A1* | 8/2015 | Tsai | ............ | A47C 1/03 |
| | | | | 297/411.32 |
| 2015/0327683 A1* | 11/2015 | Ross | ............ | A47C 7/54 |
| | | | | 297/411.32 |
| 2016/0022046 A1* | 1/2016 | Yamane | ............ | B60N 2/464 |
| | | | | 297/411.32 |

* cited by examiner

ARM REST FOR USE IN THE CONTEXT OF A VEHICLE SEAT

CROSS-REFERENCE TO RELATED APPLICATIONS

This application claims priority to German Patent Application No. 10 2014 111 925.8 filed on Aug. 20, 2014, which is fully incorporated herein by reference.

STATEMENT REGARDING FEDERALLY SPONSORED RESEARCH OR DEVELOPMENT

Not applicable.

FIELD OF THE INVENTION

The invention relates to an arm rest for being arranged at a vehicle seat having a console part that can be attached in the vehicle as well as an arm support that is mounted at the console part so as to be swivelable.

BACKGROUND OF THE INVENTION

A variety of forms of arm rests are known from the state of the art. The subject-matter of the present application are those arm rests which include an arm support that is mounted so as to be swivelable between a lower use position and an upper rest position. Here, the arm support, in the lower use position, serves for propping the arm onto it, wherein it is, however, irrelevant whether the arm support includes another function in the upper rest position. At least the swivel path of the arm support in the rest position is limited by a stop acting between the arm support and the console part.

In that respect, arm rests are, on the one hand, known from the state of the art, in particular for use in the context of a center console, the arm rest only enabling access to storage compartments being situated below the arm support in the rest position, into which said arm rests have been swiveled up. In this use scenario, a strain on the arm support due to misusage poses problems, namely when a person sitting in the rear exerts a reverse force at the free end of the arm support. This leads to high strains on the mounting of the arm support.

Moreover, comparable arm rests are known as part of a rear seat bench, wherein the arm support in this case forms part of the rear seat bench in the rest position, into which the arm support has been swiveled up. As a general rule, in this case the arm support that has been swiveled up is borne on the rear side of the arm support, such that higher strains in the area of the mounting do not have to be expected. Nevertheless, embodiments are also known in this case which do not show the arm support, as a part of the rear seat bench, to be borne at the upper side, the mounting of the arm support in this embodiment example thus equally being subject to high strains when the person sitting there leans against the arm support.

Therefore, corresponding arm rests are, as a general rule, embodied so as to have a console part consisting of metal. For this purpose, either a welded construction or a metal pressure die casted component is used. The use of a corresponding console part made of metal guarantees the required stability and prevents rupture in the area of the mounting point.

SUMMARY OF THE INVENTION

It is the object of the present invention to improve the creative freedom for the console part regarding the required installation space thereof as well as regarding the choice of materials. The set object is attained by an embodiment described herein.

The generic arm rest first of all serves for being arranged at a vehicle seat. Here, it is irrelevant whether the arm rest is directly allocated to the seat or whether it is attached at another point in the vehicle. The arm rest at least comprises a console part, which can be attached in the vehicle. At the console part, an arm support is in turn mounted so as to be swivelable about a swivel axis. Here, the arm support can be swiveled between a use position, into which said arm support has been swiveled down, and a rest position, into which said arm support has been swiveled up. It is irrelevant how the swivel path is limited in the use position. The arm support is at least mounted at the console part by way of mounting sleeves being arranged on both sides at the console part, mounting studs engaging said sleeves in each instance, said mounting studs being in turn connected to the arm support. In that respect, it is firstly irrelevant whether the relative movement is effected when the arm support is swiveled between the mounting stud and the mounting sleeve or between the mounting stud and the arm support. As a general rule, it can, however, be assumed that the relative movement is effected between the mounting stud that is fixedly attached in the arm support and the mounting sleeve appertaining to the console part.

For limiting the swivel movement into the rest position, it is envisaged that the console part includes at least one bearing surface, against which, in the rest position, a stop surface of the arm support is able to abut.

In accordance with the invention, it is now envisaged that the console part is produced as an injection molded component from a plastic material. The problems now arising regarding the required stiffness of the console component in the area of the mounting are solved in accordance with the invention in that a bearing ring that is produced from metal has been injected in each mounting sleeve. Here, it is essential that the injected bearing ring completely encloses the mounting stud annularly. In addition, bearing surfaces radially extending to the outside are arranged at each of the two mounting sleeves. Thus, it is guaranteed that when there is a reverse strain on the arm support, an advantageous force introduction onto the bearing surfaces is effected without any transverse load. For guaranteeing the required stability of the console part in the area of the bearing surface, it is required that the injected bearing rings include tabs being integrally molded thereto and radially extending to the outside, said tabs extending up to a point behind the respective bearing surface.

Thus, the forces that occur on the bearing surfaces are directly borne by the tabs of the bearing rings that have been injected on both sides, such that the strain can advantageously be introduced into the console part. Due to the selected embodiment of the console part, being made of an injection molded component, having a bearing ring that encloses the mounting stud annularly, a cost-effective component is realized, which is characterized by requiring little installation space and which can additionally absorb the required forces.

Here, it is particularly advantageous if the console part has been produced from a fiber-reinforced plastic material. Thus, the stiffness of the console part can advantageously be influenced. Here, it is particularly advantageous if fibers, for example glass fibers or carbon fibers, are employed for reinforcing the console part.

Different production methods are available for realizing the bearing ring. On the one hand, a pressure die casted component could be employed for this purpose. On the other hand, it is particularly advantageous for financial reasons if the bearing ring is manufactured from a metal plate.

In turn, there are different ways of producing the bearing ring from a metal plate, wherein one option for this is producing a lasered part, for example. However, using a punched part is advantageous, such that cost benefits can be generated if there is a corresponding number of units.

For integrating the bearing advantageously into the console part, in particular for transmitting the forces and for stabilizing the console part as well as for guaranteeing an optically flawless appearance, it is advantageous if the bearing ring, at its outer contour and its inner contour, is completely surrounded by the plastic material. Thus, the bearing ring is not visible in the outer circumference. Moreover, due to said embedding in a plastic material on the inner side, the friction property between the mounting stud and the mounting sleeve is not influenced. In addition, it is advantageous if the bearing ring is equally surrounded by the plastic material on its upper side and/or lower side.

For preventing a relative movement between the bearing ring and the surrounding plastic material of the console part, it is moreover advantageous if the bearing ring includes several perforations being distributed in the circumference. Alternatively or additionally, it is equally possible to provide the bearing ring with recesses starting from the outer contour and/or starting from the inner contour, wherein the plastic material penetrates both the perforations and the recesses. Thus, the steadiness of the bearing ring, in particular regarding a rotational movement about the swivel axis, is significantly improved.

In the following figures, an embodiment example for an arm rest in accordance with the invention is sketched.

DETAILED DESCRIPTION OF THE EXAMPLE EMBODIMENTS

Figure 1:
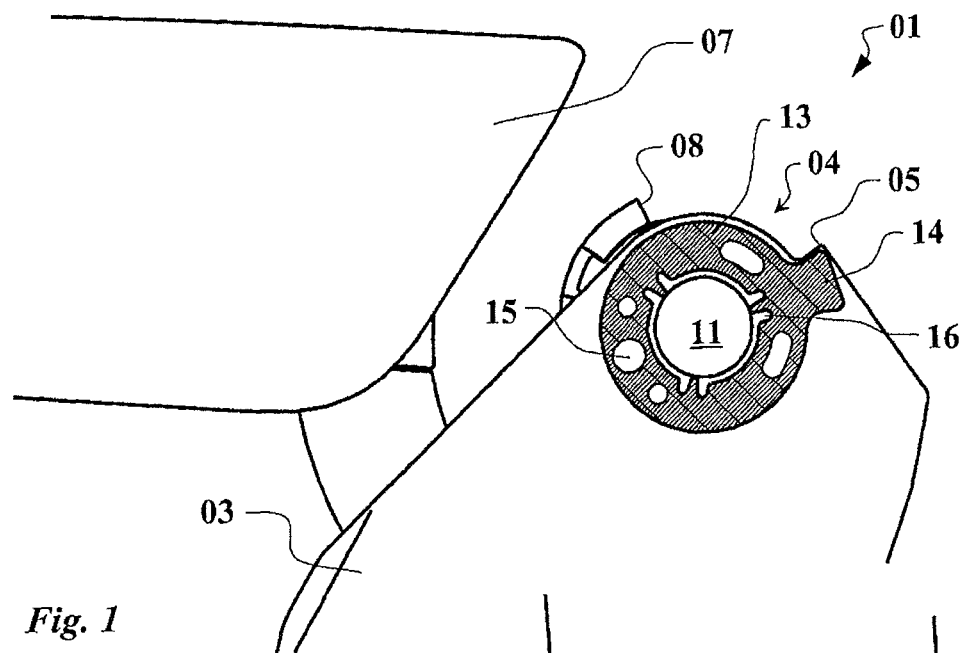
FIG. 1 shows a sketch for an exemplary way in which an arm rest in accordance with the invention can be embodied in the use position.
Figure 2:
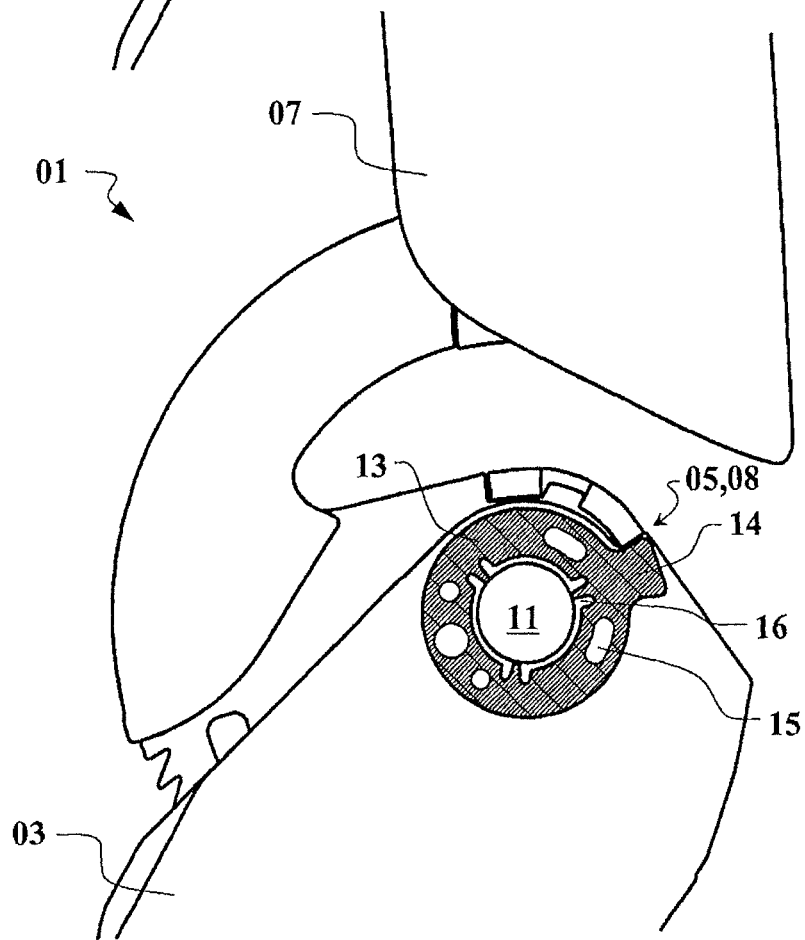
FIG. 2 shows the arm rest of FIG. 1 in the rest position.

In FIG. 1, an embodiment example of an arm rest 01 in accordance with the invention, having an arm support 07 in the use position, into which said arm support has been swiveled up, is sketched. In contrast to that, FIG. 2 shows the arm rest 01 having an arm support 07 in the rest position, into which said arm support has been swiveled up.

First of all, the console part 03 can be seen, which is attached in the vehicle. The arm support 07 is mounted at said console part so as to be swivelable. For this purpose, the console part 03 includes a mounting sleeve 04 on both sides, in which 04 a mounting stud 11 of the arm support 07 is mounted so as to be swivelable. Moreover, the console part 03 includes a bearing surface 05, which extends radially to the outside from the mounting sleeve 04. In the rest position, the arm support 07 abuts against said bearing surface, at a stop surface 08. Hereby, the swivel movement to the rear is limited in the rest position.

The required stability when employing a plastic material for the console part 03 and at the same time low consumption of the small installation space for the console part 03 in a vehicle are realized by employing a bearing ring 13 that has been injected into the mounting sleeve 04. Said bearing ring surrounds the mounting stud 11 annularly, such that the mounting sleeve 04 is prevented from swerving due to high strains. Moreover, the bearing ring 13 includes a tab 14, which radially extends to the outside and comes to rest behind the bearing surface 05. Thus, the bearing forces occurring in the rest position are transmitted from the bearing surface 05 onto the tab 14 and thus onto the bearing ring 13.

For securing the bearing ring 13 against a rotary motion within the console part 03, the bearing ring 13, in this embodiment example, includes several perforations 15 as well as recesses 16 starting from the inner contour.

Figure 3:
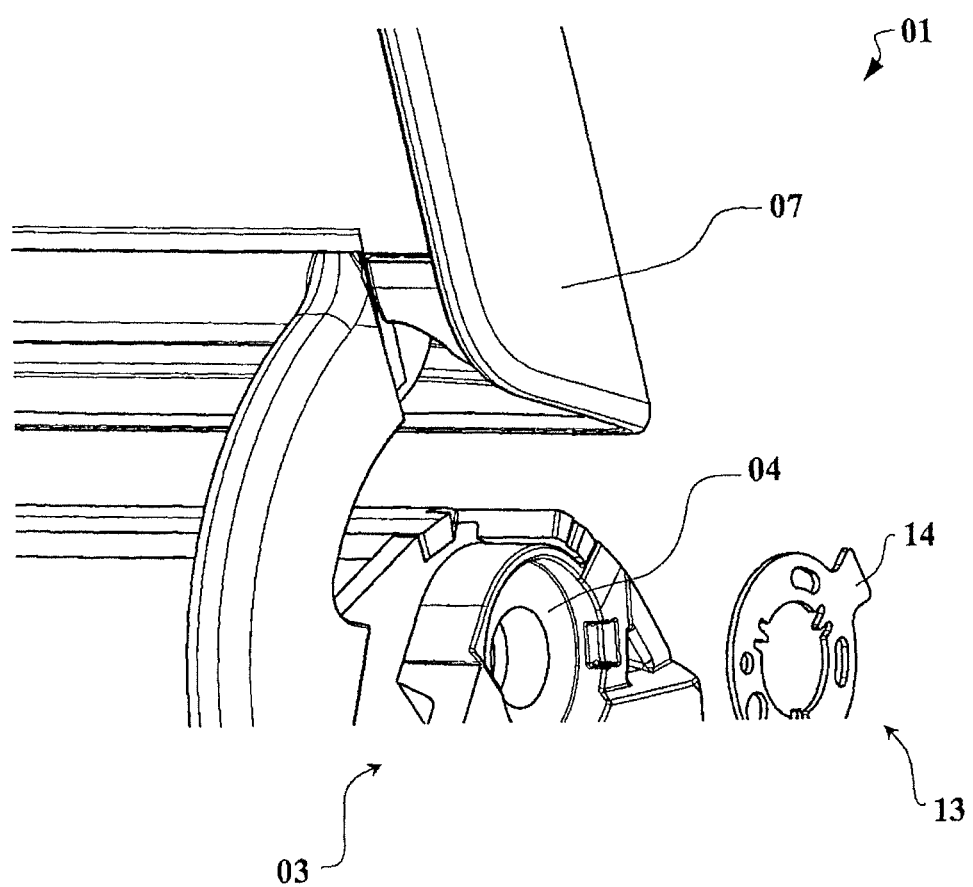
FIG. 3 shows a perspective view with respect to the arm rest of FIG. 2 with a bearing ring that is illustrated separately.

In FIG. 3, the arm rest 01 is additionally sketched in the rest position in a perspective view. The console part 03 can again be seen, the arm support 07 being mounted at said console part so as to be swivelable. In this example, the mounting stud 11 that is connected to the arm support 07 is not illustrated. In order to make it easier to see the bearing ring 13 that has been injected in the mounting sleeve 04, said bearing ring has been drawn separately.

The invention claimed is:

1. An arm rest for being arranged at a vehicle seat, said arm rest comprising:
a console part including a mounting sleeve on opposing sides of said console part, and at least one bearing surface;
an arm support mounted at the console part so as to be swivelable about a swivel axis between a use position, into which said arm support has been swiveled down, and a rest position, into which said arm support has been swiveled up, one mounting stud of the arm support being mounted in each mounting sleeve of said console part, wherein in the rest position the at least one bearing surface of said console part abuts against a stop surface of the arm support, wherein the console part is an injection molded component formed from a plastic material, wherein a metal bearing ring received in each mounting sleeve annularly encloses the mounting stud, wherein a radially outwardly extending bearing surface is arranged at each of the two mounting sleeves, said surface being borne by a tab that is integrally molded to the bearing ring.

2. The arm rest according to claim 1, in which the console part is a fiber-reinforced plastic material.

3. The arm rest according to claim 1, in which the console part is a glass fiber reinforced plastic material.

4. The arm rest according to claim 1, in which the bearing ring is manufactured from a metal plate.

5. The arm rest according to claim 1, in which the bearing ring is manufactured as a punched part from a metal plate.

6. The arm rest according to claim 1, in which the bearing ring, at an outer contour thereof and an inner contour thereof as well as on an upper side and/or on a lower side of the bearing ring, is completely surrounded by the plastic material.

7. The arm rest according to claim 1, in which the bearing ring includes several perforations distributed in the circumference and/or recesses starting from an outer contour and/or from an inner contour, the plastic material penetrating said recesses.

8. The arm rest according to claim 1, in which the bearing ring is completely embedded in the plastic material.

9. An arm rest for a vehicle seat, said arm rest comprising:
an injection molded component console part formed from a plastic material, said console part having opposing sides;
a mounting sleeve fixed to each of the opposing sides of said console part;
at least one bearing surface formed on said console part;
an arm support mounted at the console part so as to be swivelable about a swivel axis between a use position, into which said arm support has been swiveled down, and a rest position, into which said arm support has been swiveled up;
a mounting stud fixed to said arm support received in each mounting sleeve of said console part;
a stop surface formed on said arm support abutting said at least one bearing surface of said console part when said arm support is in the rest position; and
a metal bearing ring received in each mounting sleeve surrounding the mounting stud and including a radially outwardly extending tab, wherein a bearing surface of the mounting sleeve engages the radially outwardly extending tab.

\* \* \* \* \*

UNITED STATES PATENT AND TRADEMARK OFFICE
CERTIFICATE OF CORRECTION

| | | |
|---|---|---|
| PATENT NO. | : 9,630,535 B2 | Page 1 of 1 |
| APPLICATION NO. | : 14/829497 | |
| DATED | : April 25, 2017 | |
| INVENTOR(S) | : Thomas Hessdörfer | |

It is certified that error appears in the above-identified patent and that said Letters Patent is hereby corrected as shown below:

In the Specification

Column 4, Line 24:
"for being arranged at a" should be --for a--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*